United States Patent
Gray

[15] 3,691,170
[45] Sept. 12, 1972

[54] 2-(THIOCYANOALKYL)-1,2,3,4-TETRAHYDROISOQUINOLINES

[72] Inventor: Allan Poe Gray, P.O. Box 5439, St. Louis, Mo. 63160

[22] Filed: Sept. 3, 1970

[21] Appl. No.: 69,489

Related U.S. Application Data

[62] Division of Ser. No. 680,354, Nov. 3, 1967, Pat. No. 3,549,640.

[52] U.S. Cl. .............................................260/283 CN
[51] Int. Cl. ...........................................C07d 33/60
[58] Field of Search .....................260/283 S, 283 CN

[56] References Cited

UNITED STATES PATENTS 3,275,628   9/1966   Brown ...................260/283 X

Primary Examiner—Donald G. Daus
Attorney—Koenig, Senniger, Powers and Leavitt

[57] ABSTRACT 2-(Thiocyanoalkyl)-1,2,3,4-tetrahydroisoquinolines such as 2-(thiocyanoethyl)-1,2,3,4-tetrahydroisoquinoline exhibit cardiovascular activity.

4 Claims, No Drawings

2-(THIOCYANOALKYL)-1,2,3,4-TETRAHYDROISOQUINOLINES

CROSS-REFERENCE TO RELATED APPLICATION

This application is a division of my copending application Ser. No. 680,354, filed Nov. 3, 1967, for N-Alkylsulfinylalkl-and Sulfonylalkyl-1,2,3,4-Tetrahydroisoquinolines, now U.S. Pat. No. 3,549,640.

This invention relates to compositions of matter classified in the art of chemistry as tetrahydroisoquinolines having an aliphatic sulfur-containing substituent attached to the ring nitrogen atom.

The invention sought to be patented in its composition aspect, is described as residing in the concept of a chemical compound having the generalized structure:

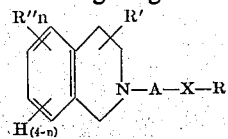

wherein A contains up to seven carbon atoms and is selected from the group consisting of alkylene; alkenylene; alkyleneoxycarbonyl; or alkyleneamino; X is selected from the group consisting of thio, sulfinyl or sulfonyl; R contains up to seven carbon atoms and is selected from the group consisting of alkyl, alkenyl, alkynyl, cycloalkyl, cycloalkenyl, aryl, alkaryl, aralkyl, amino, aminoalkyl, alkylamino, dialkylamino, alkylaminoalkyl, dialkylaminoalkyl, amidino, aminothiocarbonyl, alkylthiocarbonyl, cyano or alkylsulfonyl; R' represents a member selected from the group consisting of hydrogen or alkyl; and R'' represents a member selected from the group consisting of lower alkyl, lower alkoxy, aminoalkyl, lower dialkylamino, acetamino, halo, e.g., chloro, bromo, fluoro, iodo; haloalkyl, e.g., chloromethyl, trifluoromethyl; or methylenedioxy, i.e. two R'' 's form —O—CH$_2$—O— wherein the oxygen atoms are attached to the aromatic ring at adjacent positions, and n has a value of from zero to 2.

As used herein, the term "lower alkyl" means alkyl radicals having one to four carbon atoms, inclusive, either straight or branched chain, among which are, for purposes of illustration, but without limiting the generality of the foregoing, methyl, ethyl, n-propyl, n-butyl, isopropyl, isobutyl, secondary-butyl, and tertiary-butyl.

Preferred compositions encompassed by this invention are those represented by the aforementioned formula wherein A contains from two to six carbon atoms and R, R' and R'' each contain up to seven carbon atoms. Also preferred compositions are those wherein R' and R'' represents hydrogen, X represents thio, sulfinyl, or sulfonyl, A represents an alkylene group and R represents alkyl. Particularly preferred compositions are those wherein the ring nitrogen and the sulfur atoms are separated by at least three carbon atoms, i.e. A has at least three unbranched carbon atoms, and the total number of carbon atoms in A and R is from five to seven.

The invention sought to be patented in the process of preparation aspects is described as residing in the concept of embodying such a molecular structure in tangible form by linking a sulfur-containing organic moiety and a tetrahydroisoquinoline through its nitrogen atom by one or more processes. For example the compositions can be formed by (1) the reaction of a 2-(haloalkyl)-1,2,3,4-tetrahydroisoquinoline with a thiol to give a 2-(haloalkylthioalkyl)-1,2,3,4-tetrahydroisoquinoline (2) oxidizing the 2-(thioalkyl)-1,2,3,4-tetrahydroisoquinoline to a 2-(sulfinylalkyl)-1,2,3,4-tetrahydroisoquinoline, or (3) oxidizing the 2-(thioalkyl)-1,2,3,4-tetrahydroisoquinoline to the corresponding 2-(sulfonylalkyl)-1,2,3,4-tetrahydroisoquinoline.

The invention sought to be patented, in the process of using aspect, is described as residing in the concept of using the tangible embodiment of a composition of matter identified as a tetrahydroisoquinoline with a sulfur-containing substituent on the nitrogen atom by administering to warm blooded animals such composition as the essential active ingredient of a pharmaceutical formulation. It has been observed that the tangible embodiments of the invention possess the inherent applied use characteristics of increasing blood pressure and producing favorable cardiovascular effects as hereinafter evidenced by clinical evaluation. In addition to increasing blood pressure, the novel compositions of this invention have also been found to have vasodilator activity.

The tangible embodiments of the composition aspect of the invention in their free base form are, for the most part, liquids having low aqueous solubility and are soluble in polar solvents such as lower aliphatic alcohols. Examination of the compounds produced according to the herein described process reveals physical characteristics such as infrared spectra which confirm the molecular structure hereinbefore set forth. The aforementioned physical characteristics, taken together with analytical data the nature of the starting materials and the mode of synthesis positively confirm the structure of the compositions sought to be patented.

It will be apparent from the definition of —A—X—R in the aforementioned formula that it is intended to include specifically or as equivalents, such representative radicals as the thioalkyl groups, e.g., methylthiomethyl, methylthiopropyl, ethylthiopropyl, propylthiopropyl, methylthioisopropyl, butylthiopropyl, cyclohexylthiobutyl, cyclohexylthioisobutyl, phenylthiopropyl, naphthylthiopropyl, and the like.

Other representative radicals include the aminoalkylthioalkyl groups, e.g., aminomethylthiopropyl, aminopropylthiopropyl, methylaminoethylthiopropyl, dimethylaminopropylthiopropyl, diethylaminopropylthiopropyl, and the like; the amidinothioalkyl groups, e.g., amidinothiopropyl, amidinothiobutyl, and the like:

Synthesis of the novel tetrahydroisoquinolines of the present invention may be effected by a variety of processes as hereinafter indicated in the examples. For instance, the 2-(alkylthioalkyl)-1,2,3,4-tetrahydroisoquinolines are prepared by refluxing the appropriate alkylthioalkyl halide with tetrahydroisoquinoline. Alternatively, a 2-(haloalkyl)-tetrahydroisoquinoline hydrochloride can be prepared and then reacted with the appropriate alkylthiol in the presence of an acid acceptor. The sulfinyl and sulfonyl derivatives are prepared by oxidation of the corresponding thio compound. The generalized processes for the preparation of the thio compositions can be illustrated as follows:

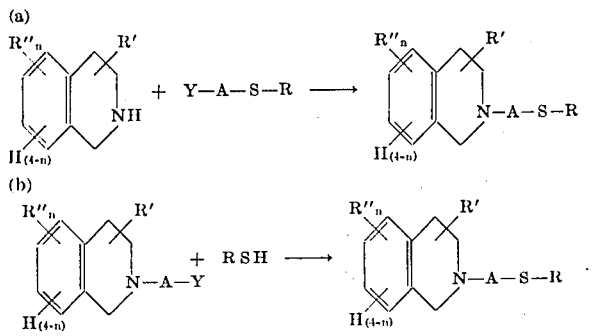

wherein A, n, R, R' and R'' are as previously defined and Y represents halogen, e.g., chloro, bromo, iodo, or R'''—SO₃— wherein R''' is lower alkyl or aryl.

Thereafter, the thio composition (I) is oxidized to the corresponding sulfinyl or sulfonyl derivative.

In the above described synthesis, it will be apparent to those skilled in the art of chemistry that the proportion of reactants, duration of reaction, solvents, acid acceptors, catalysts and the like can be varied depending on the type of reactant.

From the specific reaction conditions given in the Examples, it will be obvious to those skilled in the art of chemistry that the reagents and conditions which can be employed in the inventive process will depend to a great extent on the nature of the thiol as well as the particular tetrahydroisoquinoline.

In general, a temperature range from about 0°C. to about the reflux temperature of the solvent has been found to be satisfactory. Temperatures above and below the aforementioned range can also be employed but are less preferred. A preferred range is from about 25°C. to about 150°C.

It is also preferred, although not necessary, that the reaction of the tetrahydroisoquinoline and thiol compound be conducted in an inert solvent. In general, the choice of solvent will largely be dependent upon its inability to undergo reactions with either the starting materials or reaction products, its ease of separation from the reaction product, as well as economic considerations.

A variety of inert solvents can be employed in the practice of the instant process, i.e., saturated aliphatic hydrocarbons, aromatic hydrocarbons, aliphatic alcohols, and the like. Typical solvents which can be employed include benzene, toluene, xylene, ethanol, tertiary butanol, secondary butanol, 2-propanol, tertiary amyl alcohol, methyl isobutyl carbinol, acetone, acetonitrile, dimethylformamide, and the like. Preferred solvents are those completely miscible with the reactants and which can be readily separated.

Pressure is not necessarily critical and the process can be conducted at atmospheric, subatmospheric or superatmospheric pressures.

The contact time necessary to effect the novel process of the present invention need only be of such duration as to insure optium conversion of the reactants to the corresponding 2-substituted tetrahydroisoquinoline compound. Reaction times of several hours are thoroughly practicable. Shorter or longer periods can also be feasibly employed depending upon the temperature (higher temperatures usually permit the use of shorter reaction times), and the manner in which the process is conducted.

As previously indicated, the starting materials for the preparation of the novel composition of this invention are the tetrahydroisoquinolines and the thiols. These reactants are known compounds or can be prepared by the methods indicated in the examples.

The manner of making and using the compositions and processes of the invention is further illustrated by the following examples, which set forth one mode contemplated for carrying out the invention so as to enable any person skilled in the art of chemistry to make and use the same.

Example 1 2-(3-Ethylthiopropyl)-1,2,3,4-tetrahydroisoquinoline

A. A solution of 215 g. (1.6 moles) tetrahydroisoquinoline and 126 g. (0.8 mole) of trimethylene chlorobromide in 1,300 ml. of benzene was stirred at room temperature for 100 hours. The precipitate of 130 g. of tetrahydroisoquinoline hydrobromide was filtered off and the filtrate was extracted with dilute hydrochloric acid. The aqueous extract was made alkaline with solid potassium carbonate and the precipitated oil taken into ether. Drying and removal of the ether and distillation of the residue yielded 89 g. (53 percent) of 2-(3-chloropropyl)-tetrahydroisoquinoline, b.p. 131°–137° (3 mm.), $n^{24}D$ 1.5463.

Analysis. Calculated for $C_{12}H_{16}ClN$: N, 6.68. Found N(basic), 6.63.

2-(3-Chloropropyl)-tetrahydroisoquinoline hydrochloride, prepared in ether and recrystallized from isopropyl alcohol-ether, showed m.p. 187°–187.5°.

Analysis. Calculated for $C_{12}H_{17}Cl_2N$: C, 58.54; H, 6.96; Cl(ionic), 14.40. Found: C, 58.27; H, 7.21; Cl(ionic), 14.40.

B. To a cooled solution of 18.7 g. (0.81 g. atom) of metallic sodium in 300 ml. of ethanol was added 29.9 g. (0.48 mole) of ethanethiol. The solution was allowed to come to room temperature and 79.3 g. (0.32 mole) of 2-(chloropropyl)-tetrahydroisoquinoline hydrochloride dissolved in 150 ml. of methanol was added dropwise with stirring over a period of 20 minutes. A white precipitate formed during the addition. The reaction mixture was stirred at room temperature for 0.5 hour and at reflux for one hour. About 100 ml. of solvent was distilled out of the reaction mixture which was then poured into 1 liter of water and extracted with ether. The ether solution was extracted with dilute hydrochloric acid. A hydrochloride salt precipitate formed during the extraction. The aqueous mixture was made alkaline and extracted with ether. Drying and removal of the ether and distillation of the residual oil gave 61.5 g. (81 percent) of 2-(3-ethylthiopropyl)-1,2,3,4-tetrahydroisoquinoline, b.p. 150°–156° (0.4 mm.), $n^{25}D$ 1.5521.

Analysis. Calculated for $C_{14}H_{21}NS$: N, 5.95 Found: N(basic), 5.87.

2-(3-Ethylthiopropyl)-1,2,3,4-tetrahydroisoquinoline hydrochloride, recrystallized from isopropyl alcohol, formed colorless plates, m.p. 200.5°–202°.

Analysis. Calculated for $C_{14}H_{22}ClNS$: C, 62.02; H, 8.24; Cl, 13.04. Found: C, 61.85; H, 8.16; Cl(ionic), 13.00.

EXAMPLE 2

2-(3-Ethylsulfinylpropyl)-1,2,3,4-tetrahydroisoquinoline

To an ice cold solution of 23.5 g. (0.1 mole) of the base produced in Example 1B and 6 ml. of glacial acetic acid in 50 ml. of acetonitrile was added, dropwise with stirring, a solution of 19 g. of commercial 40 percent peracetic acid (0.1 mole) in 25 ml. of acetonitrile. The reaction mixture was stirred at room temperature for a period of 1 hour, poured into 150 ml. of water, made basic with dilute aqueous ammonia and extracted with ether. The ether solution was washed with a dilute potassium carbonate solution, water, dried and treated with ethereal hydrogen chloride. The resultant precipitate was recrystallized from isopropyl alcohol to yield 13.4 g. (47 percent) of 2-(3-ethylsulfinylpropyl)-1,2,3,4-tetrahydroisoquinoline hydrochloride in the form of colorless plates, m.p. 198°–199°.

Analysis. Calculated for $C_{14}H_{22}ClNOS$: C, 58.41; H, 7.70; Cl, 12.32. Found: C, 58.53; H, 7.66; Cl(ionic), 12.35.

EXAMPLE 3

2-(3-Thiocyanopropyl)-1,2,3,4-tetrahydroisoquinoline

To a solution at reflux of 17.8 g. (0.22 mole) of sodium thiocyanate in 100 ml. of acetonitrile was added, dropwise with stirring, a solution of the base obtained from 18.0 g. (0.073 mole) of the hydrochloride salt produced in Example 1A in 150 ml. of acetonitrile. The reaction mixture was heated at reflux on a steam bath for 18 hours, filtered and the filtrate was concentrated in vacuo to a volume of about 100 ml. The concentrate was poured into 300 ml. of water and extracted with ether. The ether solution was dried over magnesium sulfate and treated with ethereal hydrogen chloride. The precipitated oil was crystallized from isopropyl alcohol-ether and recrystallized to give 8.2 g. (42 percent) of 2-(3-thio-cyanopropyl-1,2,3,4-tetrahydroisoquinoline hydrochloride in the form of colorless needles, m.p. 140°–141°.

Analysis. Calculated for $C_{13}H_{17}ClN_2S$: C, 58.08; H, 6.37; Cl 13.19. Found: C, 57.87; H, 6.25; Cl(Schöniger), 13.36.

EXAMPLE 4

2-(Thiocyanoethyl)-1,2,3,4-tetrahydroisoquinoline

In a manner similar to that described in Example 3, 2-chloroethyltetrahydroisoquinoline was treated with sodium thiocyanate to give, after recrystallization from a mixture of methanol, isopropyl alcohol and ether, 2-(thiocyanoethyl)-1,2,3,4-tetrahydroisoquinoline hydrochloride as small, colorless needles, m.p. 179°–181°.

Analysis. Calculated for $C_{12}H_{15}ClN_2S$: C, 56.57; H, 5.93; Cl, 13.92. Found: C, 56.80; H, 6.35; Cl(Schöniger), 13.98

EXAMPLE 5

2-(3-Ethylsulfinylpropyl)-6-methyl-1,2,3,4-tetrahydroisoquinoline

In a manner similar to that set forth in Example 1A 2-(3-chloropropyl)-6-methyl-1,2,3,4-tetrahydroisoquinoline is prepared from the reaction of 6-methyl-tetrahydroisoquinoline (1.6 moles) and trimethylene chlorobromide (0.8 mole), thereafter the hydrochloride salt is formed, recrystallized and dissolved in methanol. To a cooled solution of 18.7 grams (0.81 g. atom) of metallic sodium in 300 ml. of ethanol is added 29.9 gram (0.48 mole) of ethanethiol. The solution is allowed to reach room temperature and the 2-(chloropropyl)-6-methyl-1,2,3,4-tetrahydroisoquinoline hydrochloride (0.32 mole) dissolved in methanol is added dropwise. Thereafter the reaction mixture is stirred at reflux for about 1 hour. After distilling off a portion of the solvent, the reaction mixture is poured into water and extracted with ether. The ether solution is then extracted with dilute HCl, the aqueous mixture made alkaline and extracted with ether. Drying and removal of the ether and distillation of the residue gives 2-(3-ethylthio-propyl)-6-methyl-1,2,3,4-tetrahydroisoquinoline. Elemental and infrared analysis confirms the structure.

EXAMPLES 6–9

In the following examples the analogous compounds are prepared as indicated. The methods employed are the same as those set forth in the preceding example. The starting materials and final products are set forth in Table I below:

TABLE I

| Example | Compound | Starting Material | Method of Example |
|---|---|---|---|
| 6. | 2-(3-ethylthiopropyl)-4-methyl-1,2,3,4-tetrahydroisoquinoline | 4-methyl-1,2,3,4-tetrahydroisoquinoline | 5 |
| 7. | 2-(3-methylthiopropyl)-6-methoxy-1,2,3,4-tetrahydroisoquinoline | 6-methoxy-1,2,3,4-tetrahydroisoquinoline | 5 |
| 8. | 2-(3-propylthiopropyl)-7-chloro-1,2,3,4-tetrahydroisoquinoline | 7-chloro-1,2,3,4-tetrahydroisoquinoline | 5 |
| 9. | 2-(3-ethylthiopropyl)-6-trifluoromethyl-1,2,3,4-tetrahydroisoquinoline | 6-trifluoromethyl-1,2,3,4-tetrahydroisoquinoline | 5 |

The manner of using the invention sought to be patented in its process will now be described. Quite unexpectedly, it has been discovered that the tangible embodiments of this invention exhibit favorable cardiovascular effects in warm blooded animals. It has been observed that these compositions are useful as therapeutic agents for increasing systolic blood pressure, with little or no concurrent increase in diastolic blood pressure. Hence, the compositions are useful as valuable therapeutic agents in the alleviation and control of low systolic blood pressure as would be associated with shock and other disorders. Additionally, it has been observed that the compositions of this invention are particularly unique in that while the blood pressure is increased there is no concurrent decrease in blood flow in the peripheral vascular system. In fact, an increase in blood flow rate in the peripheral vascular system has been observed when the tetrahydroisoquinoline was administered.

Various well known procedures were carried out to ascertain the cardiovascular effect of 2-(3-ethylsulfinylpropyl)-1,2,3,4-tetrahydroisoquinoline. In the preliminary tests 2-(3-ethylsulfinylpropyl)-1,2,3,4-tetrahydroisoquinoline was administered to anesthetized and unanesthetized dogs as the hydrochloride.

In the case of unanesthetized dogs, the systolic blood pressure was measured indirectly by using a tail cuff technique with the pressure recorded on a Beckman Continuous Systolic Monitor. Systolic and diastolic pressures of three dogs were also obtained with the electrosphygmograph cuff attachment to the physiograph, utilizing pressures from both the brachial and tail arteries.

Cardiac output was obtained by the dye-dilution method utilizing Cardio-Green dye and a Waters Densitometer. Dye injections were made through a catheter inserted through the right jugular vein and positioned near, or in the right atrium. Arterial sample for dye was from the left carotid artery.

The Shipley-Wilson rotameter was utilized to measure the rate of blood flow through the femoral artery. Other procedures which were employed to evaluate the effect of the tetrahydroisoquinoline are set forth in the examples.

Preliminary toxicity studies on 2-(3-ethylsulfinylpropyl)-1,2,3,4-tetrahydroisoquinoline were conducted following the usual, well defined, and standardized procedures as described in the pamphlet "Appraisal of the Safety of Chemicals in Foods, Drugs and Cosmetics," published in 1959 by the association of Food and Drug Officials in the United States. (Hogen, "Acute Toxicity", page 17; Fitzhugh, "Sabacute Toxicity", page 26; and Fitzhugh, "Chronic Oral Toxicity", page 36). Sixty day subacute toxicity tests in Wistar rats (15, 50 and 150 mg/kg of body weight per day) and Beagle dogs (10, 30, 60 and 90 mg/kg of body weight per day) indicated no significant biochemical or histalogical evidence of toxicity. The composition was administered to the dogs orally in capsules, once daily, 5 days per week. The rats received the same composition orally in drinking water 7 days per week.

The effective dosage of the compounds of this invention depends upon the individual characteristics of each case. In general, however, it has been observed that an effective concentration of the tetrahydroisoquinolines will usually range from about 0.10 to about 75 milligrams per kilogram of body weight of the warm blooded animal. A preferred range is from about 0.25 to about 50 milligrams per kilogram of body weight. The tetrahydroisoquinolines can be formulated into capsules, tablets, injectable solutions, and the like. Tablets and capsules can be formulated with the usual ingredients and excipients such as starch, methylcellulose, natural gums, dibasic calcium phosphate, lubricants, dispersing agents and the like.

In some instances it may be preferred to administer the tetrahydroisoquinolines by infusion, such as with plasma, at a constant rate over an extended period of time. In such cases, the effective concentration can be adjusted to provide the desired dosage levels.

The following examples set forth the manner of using the tetrahydroisoquinolines of this invention for increasing the blood pressure in warm blooded animals.

EXAMPLE 10

Effect of Tetrahydroisoquinolines on Systolic Blood Pressure a. An unanesthetized dog having a control blood pressure of 180/70 was injected intravenously with 0.5 mg/kg of 2-(3-ethylsulfinylpropyl)-1,2,3,4-tetrahydroisoquinoline hydrochloride and observed for 1 hour. Immediately following the injection, the person holding the dog noted a forceful pounding of the heart. This was accompanied by an increase in heart rate from a control level of 126 to 168. The heart rate then returned to the control level of 126 by the end of thirty minutes. The systolic blood pressure immediately increased from 180 to 220–230 and had almost returned to control level by the end of 1 hour. No increases in diastolic pressure were observed.

b. A second unanesthetized dog which was very calm and had a control blood pressure of 120/70 which change to 150/66 thirty minutes after intravenous administration of 1 mg/kg of 2-(3-ethylsulfinylpropyl)-1,2,3,4-tetrahydroisoquinoline hydrochloride. Heart rate increased from 72 to 100. Little or no gross stimulation occurred. On another day this same dog was injected intravenously with 0.5 mg/kg of 2-(3-ethylsulfinylpropyl)-1,2,3,4-tetrahydroisoquinoline hydrochloride. From a control pressure of 122/60 the pressure increased to 130/65 7–10 minutes after injection. A maximal increase to 145/73 occurred 43 minutes after injection. 1 ½ hours after injection the pressure was almost back to control levels.

EXAMPLE 11

Effect of Tetrahydroisoquinolines on Cardiac Output

The effect of 2-(3-ethylsulfinylpropyl)-1,2,3,4-tetrahydroisoquinoline on cardiac output was determined in a pentobarbitalized dog. The dosage was 1 mg/kg of body weight administered intravenously as the hydrochloride. The cardiac output was obtained by the dye-dilution method utilizing Cardio-Green dye and a Waters Densitometer. Dye injections were made through a catheter inserted through the right jugular vein and positioned near, or in the right atrium. Arterial sampling for dye was from the left carotid artery. The results of this experiment are given in table III. Each value in the table represents data from one dye-dilution curve. The values for controls are averages of the number in parentheses and were taken during the few minutes immediately preceding administration of the tetrahydroisoquinoline.

TABLE III

| Time (mins) | Cardiac Output (liters/min) | Mean Arterial Blood Pressure (mm Hg) | Total Peripheral Resistance[1] | Heart Rate (beats/min) | Stroke Volume (ml) |
|---|---|---|---|---|---|
| Control (2) | 2.81 | 140 | 3.02 | 144 | 19.5 |
| 2–3 | 4.95 | 142 | 1.72 | 198 | 25.0 |
| 12–13 | 5.07 | 143 | 1.69 | 204 | 24.9 |
| 29–30 | 4.48 | 140 | 1.87 | 240 | 18.2 |
| 45–46 | 3.18 | 130 | 2.45 | 228 | 14.0 |

(1) = pressure (mm Hg)/cardiac output (ml/sec)

EXAMPLE 12

EFFECT of Tetrahydroisoquinolines On Blood Flow

The Shipley-Wilson rotameter was utilized to measure the rate of blood flow through the femoral artery in the subject anesthetized dogs. Injection of 1 mg of 2-(3-ethylsulfinylpropyl)-1,2,3,4-tetrahydroisoquinoline hydrochloride into the tubing leading directly to the femoral artery resulted in an increase in flow of 1 to 2 minutes duration. This increased flow was apparently due to vasodilation since the blood pressure (recorded from the same tubing leading directly to the artery) was not increased. In two anesthetized dogs femoral blood flow was recorded and 0.5 to 1.0 mg/kg of the same tetrahydroisoquinoline hydrochloride was injected intravenously. Increases in flow of 3 to 5 minutes duration were observed. These changes were not due to any increase in blood pressure. In one of these dogs an additional intravenous injection of 10 mg/kg of the tetrahydroisoquinoline caused evidence of prolonged vasodilation.

Simple substituents on the tetrahydroisoquinoline moiety of the compounds of the present invention do not adversely affect the pharmacological properties thereof, and are to be regarded as the full equivalents of the compounds of the invention wherein the tetrahydroisoquinoline moiety is unsubstituted. For example, the molecule may also contain substituents wherein R' or R" groups are other than hydrogen. Such additions to the molecular structure of the inventive concept herein described are, therefore, equivalents of the subject matter sought to be patented.

As previously indicated, the aforementioned general formula defines the compounds of the present invention as the free base form thereof. Inasmuch as the physical embodiments of the inventive concept have pharmacological utility, for such use the compounds will usually be administered in the form of their pharmaceutically acceptable acid addition salts, these salts are the full equivalents of the free base forms thereof. The acid addition salts can be prepared by reacting the corresponding free bases in a conventional manner with an inorganic acid such as hydrochloric, hydrobromic, sulfuric and phosphoric; or an organic acid, such as methanesulfonic, ethanesulfonic, ethanedisulfonic, cyclohexylsulfamic, formic, maleic, citric, tartaric and tannic acids. The compounds can also be administered in the form of their quarternary ammonium salts formed by the reaction with a lower alkyl halide.

In addition to their use as the essential active ingredient in pharmaceutical formulations, the novel compositions of this invention can be employed in a variety of other fields. For example, the tetrahydroisoquinoline compounds of this invention are useful as intermediates in the synthesis of other chemical compounds.

What is claimed is:

1. A compound selected from the group consisting of tetrahydroisoquinolines having the formula:

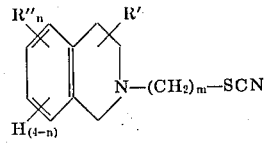

wherein R' is selected from the group consisting of hydrogen and lower primary and secondary alkyl groups; R" is selected from the group consisting of lower alkyl, lower alkoxy, halo and methylenedioxy groups; $n$ has a value of 0, 1 or 2; provided that when R" is methylenedioxy, then $R''_n$ means a single methylenedioxy group attached to adjacent carbon atoms and $H_{(4-n)}$ means $H_2$; $m$ has a value of 1, 2 or 3; and the pharmaceutically acceptable acid addition salts of said tetrahydroisoquinolines.

2. A compound as set forth in claim 1 wherein R' is hydrogen, and $n$ is 0.

3. A compound as set forth in claim 2 wherein $m$ is 2.

4. A compound as set forth in claim 2 wherein $m$ is 3.

* * * * *

PO-1050
(5/69)

UNITED STATES PATENT OFFICE
CERTIFICATE OF CORRECTION

Patent No. 3,691,170           Dated September 12, 1972

Inventor(s) Allan Poe Gray

It is certified that error appears in the above-identified patent and that said Letters Patent are hereby corrected as shown below:

Front page, data element 73 should be inserted as follows: "[73] Assignee: Mallinckrodt Chemical Works".

Column 2, line 4, "2-(haloalkylthioalkyl)" should read "2-(thioalkyl)"; line 52, after the semicolon should be inserted: "the thiocyanoalkyl groups, e.g., thiocyanoethyl, thiocyanopropyl, thiocyanobutyl, thiocyanopentyl, thiocyanoisobutyl, and the like." Column 4, line 43, "2-(chloropropyl)" should be "2-(3-chloropropyl)". Column 5, line 40, "in vacuo" should be "in vacuo"; line 46, "2-(3-thio-cyanopropyl-1" should be "2-(3-thio-cyanopropyl)-1". Column 6, line 53, "in its process will" should be "in its process aspect will". Column 8, line 51, "table III" should be "table II"; the heading "TABLE III" should be "TABLE II".

Signed and sealed this 10th day of April 1973.

(SEAL)
Attest:

EDWARD M. FLETCHER, JR.                    ROBERT GOTTSCHALK
Attesting Officer                          Commissioner of Patents